United States Patent
Johnson et al.

(10) Patent No.: US 9,206,646 B2
(45) Date of Patent: Dec. 8, 2015

(54) METHODS AND APPARATUS FOR DRILLING WELLS

(75) Inventors: Tommy Johnson, Grand Coteau, LA (US); Dustin O'Neal, Huffman, TX (US)

(73) Assignee: BULLDOG CHEMICALS, LLC, Huffman, TX (US)

( * ) Notice: Subject to any disclaimer, the term of this patent is extended or adjusted under 35 U.S.C. 154(b) by 537 days.

(21) Appl. No.: 13/473,838

(22) Filed: May 17, 2012

(65) Prior Publication Data

US 2013/0126242 A1      May 23, 2013

Related U.S. Application Data

(62) Division of application No. 12/200,906, filed on Aug. 28, 2008.

(51) Int. Cl.
*C09K 8/03* (2006.01)
*E21B 7/04* (2006.01)
*E21B 21/00* (2006.01)
*E21B 31/03* (2006.01)

(52) U.S. Cl.
CPC . *E21B 7/046* (2013.01); *C09K 8/03* (2013.01); *E21B 21/00* (2013.01); *E21B 31/03* (2013.01)

(58) Field of Classification Search
None
See application file for complete search history.

(56) References Cited

U.S. PATENT DOCUMENTS

2005/0230107 A1* 10/2005 McDaniel et al. ............ 166/249
2006/0175059 A1*  8/2006 Sinclair et al. ................ 166/283

* cited by examiner

*Primary Examiner* — Alicia Bland
(74) *Attorney, Agent, or Firm* — Gilbreth Roebuck, PC; J. M. (Mark) Gilbreth

(57) ABSTRACT

A well fluid additive having a heavier first bead and a lighter second bead, with the first bead having a specific gravity that exceeds the specific gravity of the second bead by at least 1 percent.

1 Claim, No Drawings

METHODS AND APPARATUS FOR DRILLING WELLS

REFERENCE TO RELATED APPLICATIONS

This patent application claims priority of and is a Divisional Patent Application of U.S. patent application Ser. No. 12/200,906, filed Aug. 8, 2008, and herein incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates to drilling of wells, well fluids, and well fluid additives and to methods, apparatus and products related thereto.

2. Description of the Related Art

The purpose of a rotary oil rig is to drill a hole to a predetermined depth. And, hopefully, in the drilling process, passing to or through one or more oil and gas bearing reservoir rock formations. Since rigs are expensive to manufacture, they need to be movable. In addition, since the rock chips created by the drilling bit must be removed, mud is pumped through the drill pipe to the bit and back up the annulus or space between the drill pipe and the outer casing that is added as drilling proceeds. The mud is mixed, usually with water but sometimes with chemicals, in a chemical tank, then sucked from the mud pit and pumped via a standpipe and rotary hose to a swivel that is attached to a Kelly, which is itself attached to the drill pipe. The returning mud and rock chips that reach the surface move by gravity down a return line to a shale shaker designed to separate the returning mud from the shale for reuse. The remaining rock chips travel down a shale slide to a reserve pit.

Technology in drilling for oil and gas has for a number of years included horizontal or directional drilling. The horizontal drilling concept exposes more surface area of the producing zone than the conventional vertical drilling operations.

Horizontal drilling technology achieved commercial viability during the late 1980's. Its successful employment, particularly in the Bakken Shale of North Dakota and the Austin Chalk of Texas, has encouraged testing of it in many domestic geographic regions and geologic situations. Achievable horizontal bore hole length grew rapidly as familiarity with the technique increased; horizontal displacements have now been extended to over several miles. Some wells have featured multiple horizontal bores. Completion and production techniques have been modified for the horizontal environment, with more change required as the well radius decreases; the specific geologic environment and production history of the reservoir also determine the completion methods employed.

The technical objective of horizontal drilling is to expose significantly more reservoir rock to the well bore surface than can be achieved via drilling of a conventional vertical well. The desire to achieve this objective stems from the intended achievement of other, more important technical objectives that relate to specific physical characteristics of the target reservoir, and that provide economic benefits. Examples of these technical objectives are the need to intersect multiple fracture systems within a reservoir and the need to avoid unnecessarily premature water or gas intrusion that would interfere with oil production.

In both examples, an economic benefit of horizontal drilling success is increased productivity of the reservoir. In the latter example, prolongation of the reservoir's commercial life is also an economic benefit. Applications of horizontal drilling technology have included the drilling of fractured conventional reservoirs, fractured source rocks, stratigraphic traps, heterogeneous reservoirs, coalbeds (to produce their methane content), older fields (to boost their recovery factors), and fluid and heat injection wells intended to boost both production rates and recovery factors.

Horizontal drilling is the process of drilling and completing, for production, a well that begins as a vertical or inclined linear bore which extends from the surface to a subsurface location, just above the target oil or gas reservoir called the "kickoff point," then bears off on an arc to intersect the reservoir at the "entry point," and, thereafter, continues at a near-horizontal attitude tangent to the arc, to substantially or entirely remain within the reservoir until the desired bottom hole location is reached.

Most oil and gas reservoirs are much more extensive in their horizontal (areal) dimensions than in their vertical (thickness) dimension. By drilling that portion of a well that intersects such a reservoir parallel to its plane of more extensive dimension, horizontal drilling's immediate technical objective is achieved.

That objective is to expose significantly more reservoir rock to the wellbore surface than would be the case with a conventional vertical well penetrating the reservoir perpendicular to its plane of more extensive dimension. The desire to attain this immediate technical objective is almost always motivated by the intended achievement of more important objectives (such as avoidance of water production) related to specific physical characteristics of the target reservoir.

For example, if a producing zone is fifty feet in thickness and a vertical well is drilled through such a zone, then only fifty feet of the producing zone will be exposed for production. In contrast, a horizontally drilled well may penetrate the producing sand or zone by one thousand feet or more. The amount or volume of oil or gas production is directly proportional to the horizontal penetration in feet into the producing sand or zone. In horizontal or directional drilling where the drill pipe must bend in order to achieve the desired penetration into the producing zone, friction becomes a major problem. The primary source of friction is directly related to the adhesion of the drilling assembly to the wall cake which lines the drilled well bore. The capillary attractive forces generated by the adhesion of the drilling assembly to the wall cake are directly proportional to the amount or footage of the drilling assembly exposed to the surface of the wall cake.

In the drilling of horizontal wells, gauge problems, sticking of the drill string, reactive torque, hole erosion, and tortuosity between the dynamic work string and bore hole, are generally all exacerbated. Tortuosity includes the effect of rotation of the bit and its reactive torque against the formation thereby causing the bit, bottom hole assembly and drill string to buckle, turn and twist within the well bore. Tortuosity effects well path, penetration rate, pipe sticking, etc. In an effort to overcome these issues, many methods have been used in order to reduce friction between the drilling assembly and the wall cake.

One such method would be to add a liquid lubricant to the drilling fluid in order to reduce the coefficient of friction of the drilling fluid. These liquid lubricants include oils, such as hydrocarbon based oils, vegetable oils, glycols, etc. These liquid lubricants will usually reduce the coefficient of friction of the drilling fluid resulting in a reduction of friction between the drilling assembly and the wall cake of the well bore.

Another method has been the use of spherical drilling beads in the drilling fluid to function as the friction reducer. These drilling beads act like ball bearings and function as a lubricant in well drilling applications.

These spherical beads are generally selected to have specific gravity greater than that of the well fluid, such that due to the horizontal inclination of the borehole, gravity will segregate the spherical beads to a position "below" the drill string.

Drilling Sideways—A Review of Horizontal Well Technology and Its Domestic Application, April 1993, published by the Energy Information Administration, Office of Oil and Gas, of the U.S. Department of Energy, is an overview of horizontal drilling technology.

U.S. Pat. No. 5,839,520, issued Nov. 24, 1998, to Maillet, discloses a method of increasing the penetration rate of a drill string within a deviated well bore. The method includes providing a drill string with a drilling bottom hole assembly, and rotating the bit in order to create the deviated well bore as well as a filter cake on the walls of the well bore. A pill comprising a spherical bead is prepared and pumped down into the well bore. The pill is allowed to migrated to the low side of the bore hole so that tortuosity is reduced. A method of slide drilling, batch drilling, and running a liner in a well is also disclosed utilizing the spherical beads. In the novel methods disclosed, the spherical beads are allowed to migrate to the low side of the borehole and are allowed to penetrate through the borehole's filter cake.

IADC/SPE 72290, Drilling Fluids Design and Management for Extended Reach Drilling, C. Cameron, SPE, Halliburton Energy Services 2001, discloses use of solid glass beads for reduction in torque whilst running casing, which act as "ballbearings" between the casing or open hole and the drill pipe or casing.

U.S. Pat. No. 7,001,871, issued Feb. 21, 2006, to Rayborn, discloses water-based drilling fluid additive containing talc and graphite. The drilling fluid additive is provided wherein the additive is manufactured by a method comprised of admixing at least one carrier such as a polypropylene glycol to talc and subsequently admixing graphite to the talc and carrier mixture; and then admixing an uintaite (a natural black bitumen) to the talc, carrier and graphite mixture.

U.S. Patent Publication No. 20070111899, published May 17, 2007, to Wood, discloses pre-engineered pills for the improvement of drilling muds. By introducing pills of ground elastomer into the well, the pills can improve the lubricity of the mud as well as aiding in wellbore cleaning, prevention of bit balling and reduction of fluid loss to thief zones. The pills can be prepared either on site or at a remote location and then transported to the drilling site for use. When the pill is prepared on site, the ground elastomer and non-aqueous fluid should be in contact with each other for a period sufficient to insure that the non-aqueous fluid has impregnated the elastomer particles. This will typically run from about 15 to 30 minutes.

SUMMARY OF THE INVENTION

The following presents a general summary of some of the many possible embodiments of this disclosure in order to provide a basic understanding of this disclosure. This summary is not an extensive overview of all embodiments of the disclosure. This summary is not intended to identify key or critical elements of the disclosure or to de lineate or otherwise limit the scope of the claims. The following summary merely presents some concepts of the disclosure in a general form as a prelude to the more detailed description that follows.

According to one embodiment of the present invention, there is provided a well fluid additive. The additive includes a heavier first bead and a lighter second bead. The first bead has a specific gravity that exceeds the specific gravity of the second bead by at least 1 percent.

According to another embodiment of the present invention, there is provided a well fluid additive for a well fluid having a well fluid specific gravity. The additive includes a heavier first bead having a first specific gravity and a lighter second bead having a second specific gravity. The first bead first specific gravity exceeds the well fluid specific gravity, and the second bead second specific gravity is less than the well fluid specific gravity.

According to even another embodiment of the present invention, there is provided a method of modifying a well fluid. The method includes contacting the well fluid with a well fluid additive. The well fluid additive comprises a heavier first bead and a lighter second bead. The first bead has a specific gravity that exceeds the specific gravity of the second bead by at least 1 percent.

According to still another embodiment of the present invention, there is provided a method of modifying a well fluid having a well fluid specific gravity. The method includes contacting the well fluid with a well fluid additive. The well fluid additive comprises a heavier first bead having a first specific gravity and a lighter second bead having a second specific gravity. The first bead first specific gravity exceeds the well fluid specific gravity, and the second bead second specific gravity is less than the well fluid specific gravity.

According to yet another embodiment of the present invention, there is provided an apparatus comprising a well and a well fluid circulating in the well. The well fluid comprises a well fluid component and a well fluid additive. The well fluid additive comprises a heavier first bead and a lighter second bead. The first bead has a specific gravity that exceeds the specific gravity of the second bead by at least 1 percent.

According to even still another embodiment of the present invention, there is provided an apparatus comprising a well and a well fluid having a well fluid specific gravity circulating in the well. The well fluid comprises a well fluid component and a well fluid additive. The well fluid additive comprises a heavier first bead having a first specific gravity and a lighter second bead having a second specific gravity. The first bead first specific gravity exceeds the well fluid specific gravity, and the second bead second specific gravity is less than the well fluid specific gravity.

According to even yet another embodiment of the present invention, there is provided a method of operating a well that includes circulating a well fluid in the well. The well fluid comprises a well fluid component and a well fluid additive. The well fluid additive comprises a heavier first bead and a lighter second bead. The first bead has a specific gravity that exceeds the specific gravity of the second bead by at least 1 percent.

According to even still another embodiment of the present invention, there is provided a method of operating a well including circulating a well fluid having a well fluid specific gravity circulating in the well. The well fluid comprises a well fluid component and a well fluid additive. The well fluid additive includes a heavier first bead having a first specific gravity and a lighter second bead having a second specific gravity. The first bead first specific gravity exceeds the well fluid specific gravity, and the second bead second specific gravity is less than the well fluid specific gravity.

DETAILED DESCRIPTION OF THE INVENTION

The present invention includes well fluid additives comprising a heavier first bead and a lighter second bead, wherein first bead has a specific gravity that exceeds the specific gravity of the second bead by at least 1, 2, 4, 5, 10, 15, 20, 25, 30, 40, 45, 50, 75, 100, 150, 200, or 300 percent. It should be understood that as used herein, the first bead may comprise a first set of beads, and the second bead may comprise a second set of beads.

It should be understood that any suitable specific gravity may be utilized for the beads of the present invention. The well fluids typically have specific gravities in the range of about 1 to about 4, with the specific gravity of the beads selected according to where the beads are to be positioned. While any suitable range of bead specific gravity may be utilized, non-limiting examples of commercially available beads include those from about 0.5 to about 5, and from about 1 to about 4. It should be understood that as difference between the specific gravity of the bead and the well fluid increases, the bead is more likely to settle at/near the bottom or float at/near the top of the well fluid. Beads with specific gravities close to that of the well fluid may tend to more slowly settle at the bottom or float at/near the top of the well fluid. By selecting specific gravities of the beads, it may be possible to urge the beads to be a different points of the well fluid, that is, there may be different layers or zones of beads.

It may be desirable to utilize beads of different physical properties at various points or zones of the well fluid. As a non-limiting example, in a horizontal section, the beads of different properties may be below the pipe, along the side of the pipe, and/or above the pipe. That is, the beads that are below the pipe will have the weight of the pipe as a factor, whereas, beads above the pipe will not, and those along the side of the pipe may or may not be effected by the weight of the pipe.

Because of the differences in specific gravity, the first bead and the second bead will be urged by gravity to congregate in different levels of the wellbore. In a horizontal portion of a wellbore, the horizontal centerline of the wellbore divides the wellbore into a "low side" that is below the centerline, and a "high side" that is above the centerline. The low side will include a portion that is below the drill string, the high side will include a portion that is above the drill string, and both low and high sides include portions that are along the sides of the drill string. The side of the drill string may be positioned in some combination of the low and high sides. Various embodiments of the present invention provide for both beads to congregate on the low side or the high side, or for the first on the low side and the second on the high side. Beads may also congregate along the side of the drill string. When both beads are on the same side of the wellbore, it is believed that the beads may be formed into layers that are predominately one bead or the other to optimize the frictional reduction.

The present invention also includes well fluid additives for a particular well fluid having a well fluid specific gravity, which comprises a heavier first bead and a lighter second bead, wherein the first bead has a specific gravity exceeding that of the well fluid specific gravity, and the second bead has a specific gravity less than that of the well fluid specific gravity. This generally means that the heavier first bead will be urged by gravity toward the low side of the wellbore, and the lighter second bead will be urged by gravity toward the high side of the well bore. As non-limiting examples, the first bead specific gravity may exceed the well fluid specific gravity by at least 1, 2, 4, 5, 10, 15, 20, 25, 30, 40, 45, 50, 75, 100, 150, 200, or 300 percent. As non-limiting examples, the well fluid specific gravity may exceed the second bead specific gravity by at least 1, 2, 4, 5, 10, 15, 20, 25, 30, 40, 45, 50, 75, 100, 150, 200, or 300 percent.

In the practice of the present invention, the heavier first bead and lighter second bead may comprise any sort of relatively spherical bead that is generally suitable for the drilling of wells. Non-limiting examples of which include polymeric drilling beads, silicone beads, graphite beads, metal beads, ceramic beads, diamond beads, fullerene beads, metallofullerene beads, composite material beads, glass drilling beads, and any bead combination thereof, and beads made from a combination of any of the foregoing materials.

Any suitable ratio of heavier first bead and lighter second bead may be utilized, depending upon the conditions of the well. As a non-limiting example, it may be desirable to utilize more of the heavier first bead which will generally wind up on the low side of the wellbore, and less of the lighter second bead which will generally wind upon on the high side of the wellbore. Suitable ratios of first bead to second bead include 99:1, 95:5, 90:10, 80:20, 70:30, 60:40 and 50:50 and inverses thereof.

In the practice of the present invention, the first bead and second bead may be packaged together to form a well fluid additive. In the practice of the various methods of the present invention, the first bead and second bead may be added simultaneously, or may be added sequentially.

The present invention also includes well fluids comprising a well fluid and the well fluid additive as described above.

The well fluid utilized in the present invention includes any suitable well fluid that may be utilized for drilling a well.

In the practice of the present invention, the well fluid additive may comprise at least 0.01, 0.1, 0.5, 1, 2, 5, 10, 15, 20, 25, 30, 50, or 75 weight percent of the well fluid.

The present invention also includes methods of modifying a well fluid comprising contacting the well fluid with a well fluid additive as described above. The present invention contemplates that the well fluid additive may be added to a well fluid above ground, or while the well fluid is in the wellbore.

The present invention also includes methods of operating a well by circulating a well fluid through the well, wherein the well fluid comprises well fluid and the well fluid additive as described above. Non-limiting embodiments of these methods of operating a well include embodiments in which at least most of the first bead and the second bead congregate on the low side of the wellbore; in which at least most of the first bead and the second bead congregate on the high side of the wellbore; in which at least most of the first bead congregates on the low side of the wellbore and at least most of the second bead congregates on the high side of the wellbore; in which all of the first bead and the second bead congregate on the high side of the wellbore; and in which all of the first bead congregates on the low side of the wellbore and all of the second bead congregates on the high side of the wellbore.

The present invention also includes apparatus comprising a well have circulating therein a well fluid comprising a well fluid component and the well fluid additive as described above. Non-limiting embodiments of this apparatus include embodiments in which at least most of the first bead and the second bead congregate on the low side of the wellbore; in which at least most of the first bead and the second bead congregate on the high side of the wellbore; in which at least most of the first bead congregates on the low side of the wellbore and at least most of the second bead congregates on the high side of the wellbore; in which all of the first bead and the second bead congregate on the high side of the wellbore; and in which all of the first bead congregates on the low side of the wellbore and all of the second bead congregates on the high side of the wellbore.

The apparatus, methods and products of the present invention have described and illustrated by examples. While these apparatus, methods and products have been described in terms of particular embodiments and illustrative figures, one of ordinary skill in the art will recognize that the invention and the appended claims are not limited to the embodiments or figures described. In addition, where methods and steps described above indicate certain events occurring in certain order, those of skill in the art will recognize that the ordering of certain steps may be modified and that such modifications are in accordance with the invention, and embodiments of the invention. Additionally, certain of the steps may be performed concurrently or in parallel processes when possible, as well as performed sequentially, as described above. Thus, to the extent that there are embodiments of the invention, which are within the spirit of the disclosure or equivalent to the inventions found in the claims, it is intended that the patent will cover those embodiments as well. Finally, all publications, patents and patent applications cited in this specification are herein incorporated by reference in their entirety as if each individual reference was specifically and individually set forth herein.

What is claimed is:

1. A method of operating a well, wherein the well defines a horizontal wellbore portion, wherein a dynamic drill string is positioned in the horizontal wellbore portion, wherein the drill string divides the horizontal well portion into an upper portion above the drill string and a lower portion below the drill string, the method comprises:
   circulating a drilling fluid, in the horizontal wellbore portion into contact with the dynamic drill string, wherein the drilling fluid has a drilling fluid specific gravity, and comprises a drilling fluid component and a drilling fluid additive, wherein, the drilling fluid additive comprises:
   first beads and second beads, with the first beads having a specific gravity greater than the drilling fluid specific gravity with the first beads circulating into the lower portion, and the second beads having a specific gravity less than the drilling fluid specific gravity with the second beads circulating into the upper portion.

* * * * *